(12) United States Patent
Karwacki et al.

(10) Patent No.: US 12,426,573 B2
(45) Date of Patent: Sep. 30, 2025

(54) METHOD AND SYSTEM FOR FODDER ADMINISTRATION

(71) Applicant: DELAVAL HOLDING AB, Tumba (SE)

(72) Inventors: Szymon Karwacki, Tumba (SE); Ulrika Öhman, Tumba (SE)

(73) Assignee: DeLaval Holding AB, Tumba (SE)

( * ) Notice: Subject to any disclaimer, the term of this patent is extended or adjusted under 35 U.S.C. 154(b) by 479 days.

(21) Appl. No.: 16/639,355

(22) PCT Filed: Aug. 14, 2018

(86) PCT No.: PCT/SE2018/050825
§ 371 (c)(1),
(2) Date: Feb. 14, 2020

(87) PCT Pub. No.: WO2019/035756
PCT Pub. Date: Feb. 21, 2019

(65) Prior Publication Data
US 2021/0360900 A1  Nov. 25, 2021

(30) Foreign Application Priority Data
Aug. 16, 2017 (SE) .................................. 1750998-5

(51) Int. Cl.
*A01K 5/02* (2006.01)
*A01K 5/00* (2006.01)

(52) U.S. Cl.
CPC ............ *A01K 5/0275* (2013.01); *A01K 5/001* (2013.01); *A01K 5/0291* (2013.01)

(58) Field of Classification Search
CPC ..... A01K 5/0275; A01K 5/001; A01K 5/0291
See application file for complete search history.

(56) References Cited

U.S. PATENT DOCUMENTS 8,633,820 B2 * 1/2014 Jonsson ................. H04L 67/12
426/531
9,091,644 B2 * 7/2015 Mazeris ............. G01N 21/3563
(Continued)

FOREIGN PATENT DOCUMENTS

CA       2705973 A1 *  6/2009  ............. A01K 1/105
DE  102010033886 A1 *  2/2012  ......... A01F 25/2027
(Continued)

OTHER PUBLICATIONS

SE Search Report, dated Apr. 13, 2018, from corresponding SE application No. 1750998-5.
(Continued)

*Primary Examiner* — Peter M Poon
*Assistant Examiner* — Hae Rie Jessica Byun
(74) *Attorney, Agent, or Firm* — NIXON & VANDERHYE

(57) ABSTRACT

A method and system are arranged to perform a feed-related action at a feed table, upon which fodder for feeding of a group of animals is present. The system includes a sensor, configured to measure constituents, physical property or chemical property of the fodder on the feed table at a first point in time; a database, configured to store the measured constituents, physical property or chemical property of the fodder, associated with the first point in time; and a controller, configured to perform the feed-related action, based on the measured constituents, physical property or chemical property of the fodder.

16 Claims, 6 Drawing Sheets

(56) References Cited

U.S. PATENT DOCUMENTS

| | | | |
|---|---|---|---|
| 10,052,600 | B2 | 8/2018 | Bresciani |
| 11,122,770 | B2 * | 9/2021 | Ruizenaar .......... G01N 21/3563 |
| 2002/0174834 | A1 * | 11/2002 | van den Berg .......... A01K 1/12 119/51.02 |
| 2012/0287745 | A1 * | 11/2012 | Ghiraldi ............... A01K 5/0275 366/152.1 |
| 2015/0034014 | A1 | 2/2015 | Van Kuilenburg |
| 2017/0055494 | A1 * | 3/2017 | Ruizenaar ................ A01K 5/02 |

FOREIGN PATENT DOCUMENTS

| | | | | |
|---|---|---|---|---|
| EP | 0974264 | A1 | 1/2000 | |
| EP | 1886556 | A2 | 2/2008 | |
| EP | 2134161 | B1 | 3/2015 | |
| EP | 3025776 | A1 | 6/2016 | |
| JP | S59-95831 | A | 6/1984 | |
| JP | S63-98334 | A | 4/1988 | |
| JP | 2007-282549 | A | 11/2007 | |
| JP | 2011-505626 | A | 2/2011 | |
| WO | 2005/067704 | A1 | 7/2005 | |
| WO | 2009/070007 | A1 | 6/2009 | |
| WO | WO-2013095281 | A1 * | 6/2013 | ............... A01K 5/02 |
| WO | WO-2014033275 | A1 * | 3/2014 | ............. A01K 1/105 |
| WO | WO-2015065172 | A1 * | 5/2015 | ............. A01F 25/20 |
| WO | 2018/038602 | A1 | 3/2018 | |

OTHER PUBLICATIONS

International Search Report and Written Opinion, dated Nov. 9, 2018, from corresponding PCT application No. PCT/SE2018/050825.

Office Action issued in Japanese Patent Application No. 2020-501201 dated Jun. 3, 2022.

* cited by examiner

METHOD AND SYSTEM FOR FODDER ADMINISTRATION

TECHNICAL FIELD

This document discloses a method and a system. More particularly, a method and a system are described, for fodder administration at a feed table, for feeding of a group of animals.

BACKGROUND

At an animal farm, the nutrition level of provided fodder, and the amount of provided fodder are essential in order to promote milk yield/meat quality.

Considerations regarding nutritional demands of the animals (Including grouping), ration management (includes analysis of the fodder, cost and availability), fodder preparation and transport, feed distribution and consumption control have to be made.

Total Mixed Ration (TMR) is a frequently used method of feed delivery on farms. The cows may often be grouped according to their level of milk production and body condition. Each group of animals is then fed with TMR feed independently to reduce over-feeding of nutrients and therefore feed costs.

The fodder may be provided on a feed table or similar arrangement, e.g. by a feed wagon, or directly by the farmer.

A first problem that may occur is that the animals eat the fodder closest to the edge of the feed table, while not being able to reach feed more centrally positioned on the feed table. The animals are typically restricted from entering the feed table by a fence or similar restrictive structure.

A known solution to this problem is to use a feed pusher, to move fodder from a central position on the feed table to a position closer to an edge of the feed table, so that the animals are enabled to conveniently reach the provided fodder.

However, another problem is that fodder may deteriorate over time. On farms where mobile mixer wagons are used, most often fodder is dispensed only once a day and in large quantity. Then it is lying at the feed table for long hours, which has negative impact on its quality. High temperature disturbs microbiological balance of fodder which leads to growth of yeasts and moulds which quickly can lower levels of starch, carbohydrates, protein in the fodder.

The quality of anaerobically fermented or ensiled fodder is dependent on the quality of the crude feed, the conditions of ensiling, and the conditions of storage of the ensiled feed. For instance, aerobic deterioration of ensiled feeds is detrimental to the milk production. Aerobic microorganisms such as yeasts, moulds and certain bacteria metabolise the highly-digestible fraction of the dry matter and can account for high losses of dry matter.

Thus, the fodder has much less nutritional value, which leads to lower milk yield. However, the farmer may not even be aware of this problem; or at least not the reason for the decreased milk yield. Also, high temperature (and long-term exposure at high temperature) has negative influence on taste and smell of the fodder, which makes it less attractive for the animals. This leads to lower feed intake (and thus lower milk yield) but also bigger feed wastage and thereby also increased costs. Heat/high temperature is often a problem in a barn, as each animal generates and excretes heat.

It would be desired to avoid serving deteriorated fodder to the animals in order to increase the milk yield/meat production.

SUMMARY

It is therefore an object of this invention to solve at least some of the above problems and improve fodder administration at a feed table.

According to a first aspect of the invention, this objective is achieved by a system arranged to perform a feed related action at a feed table upon which fodder for feeding of a group of animals is present. The system comprises a sensor, configured to measure constituents, physical property or chemical property of the fodder on the feed table at a first point in time. Also, the system comprises a database, configured to store the measured constituents, physical property or chemical property of the fodder, associated with the first point in time. The system in addition comprises a control unit, configured to perform the feed related action, based on the measured constituents, physical property or chemical property of the fodder.

According to a second aspect of the invention, this objective is achieved by a method to perform a feed related action at a feed table, upon which fodder for feeding of a group of animals is present. The method comprises measuring constituents, physical property or chemical property of the fodder on the feed table at a first point in time. Further, the method comprises storing the measured constituents, physical property or chemical property of the fodder, associated with the first point in time. The method also comprises performing the feed related action, based on the measured constituents, physical property or chemical property of the fodder.

Thanks to the described aspects, by measuring constituents, physical property or chemical property of the fodder on the feed table with a sensor, fodder deterioration may be detected at an early stage and an appropriate action may be triggered for eliminating, reducing or compensating for detected fodder deterioration, e.g. by remixing the fodder, by providing a smaller amount of fodder but more frequent, by cooling the fodder on the fodder table, etc. Fodder quality is enhanced, leading to increased milk yield/meat production.

Thereby, the fodder management of the animal is facilitated. Also, working time of the farmer is saved, due to the autonomy of the provided system and method.

Other advantages and additional novel features will become apparent from the subsequent detailed description.

FIGURES

Embodiments of the invention will now be described in further detail with reference to the accompanying figures, in which.

DETAILED DESCRIPTION

Embodiments of the invention described herein are defined as a method and a system, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
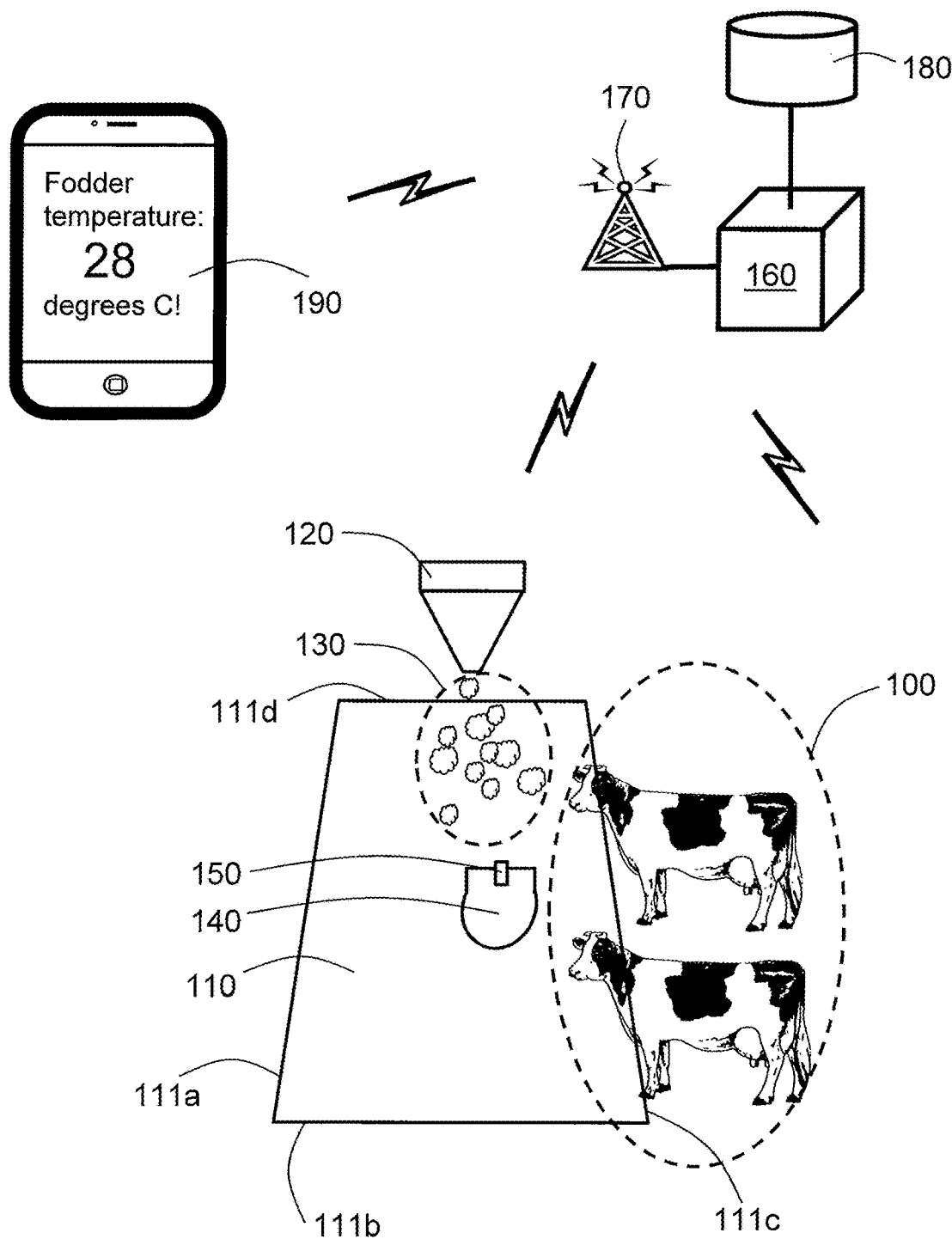
FIG. 1A illustrates an example of a system for fodder administration at a feed table, according to an embodiment of the invention.

FIG. 1A illustrates a scenario with a group of animals 100 which may be comprised in a herd of animals at a dairy farm, e.g. forming a subset of the herd.

"Animal" may be any arbitrary type of domesticated animal but perhaps in particular a female animal, such as a dairy animal, typically a substantially female mammal, or an odd/even-toed ungulate with mammary glands. The herein provided non-limiting examples primarily relates to milk and/or meat producing animals such as e.g. cow, goat, sheep, horse, camel, dromedary, primate, dairy buffalo, donkey, reindeer, llama, yak, elk, etc.

Fodder 130 may be provided to a feed table 110, e.g. by a feed distributor 120, or manually by the farmer. The fodder 130, which may comprise e.g. grass, grain, corn, ensiled feed, etc., may be provided with a certain periodicity such as once a day, twice a day, etc. Typically, the fodder 130 is provided at a distance from a feed table edge 111a, 111b, 111c, 111d for not harming the animals 100. The animals 100 starts eating fodder 130 reachable at the feed table edge 111a, 111b, 111c, 111d, but after a while the fodder 130 within reach ends. The animals 100 are prevented from entering the feed table 110 by a feed fence or similar restrictive construction.

A feed displacer 140, such as a feed pusher, may then displace fodder 130 on the feed table 110 towards an edge 111a, 111b, 111c, 111d of the feed table 110.

The feed displacer 140 may comprise a sensor 150, configured to measure constituents, physical property or chemical property of the fodder 130 on the feed table 110. The sensor 150 may comprise e.g. a thermometer, a hygrometer, a camera, a stereo camera, an infrared camera, a video camera, a radar, a lidar, an ultrasound device, a time-of-flight camera, an Infrared (IR) sensor, a Near-IR (NIR) instrument, or similar device, in different embodiments.

The sensor 150, or set of distinct sensors of different sensor types such as a NIR sensor, a thermometer, a chemical sensor etc., as the case may be, may measure and estimate various constituents and/or parameters related to fodder quality. A NIR instrument may for example measure constituent of the fodder 130. The measured fodder constituent may comprise any of: protein content, dry content/dry matter, fibre content, neutral detergent fibre, fat, starch, crude fibre, acid detergent fibre, lignin, vitamin content, minerals, etc.

The NIR instrument utilises near-infrared spectroscopy, a spectroscopic method that uses the near-infrared region of the electromagnetic spectrum, from about 700 nm to about 2500 nm. Near-infrared spectroscopy is based on molecular overtone and combination vibrations. Such transitions are forbidden by the selection rules of quantum mechanics. As a result, the molar absorptivity in the near-IR region is typically quite small. One advantage is that NIR can typically penetrate much farther into a sample than mid infrared radiation. Near-infrared spectroscopy is thereby very useful in probing bulk material with little or no sample preparation. Advantages associated with using a NIR instrument as a sensor 150 for determining quality of the fodder 130 comprises that it is accurate, reliable, rapid, non-destructive, and inexpensive.

In the illustrated embodiment, the sensor 150 is comprised on the feed displacer 140. However, in other embodiments, a plurality of sensors 150 may be arranged on the feed displacer 140, on the feed distributor 120, on the feed table 110, or other convenient location in the barn, e.g. where the fodder 130 could be surveyed by the sensor 150.

The measurements of the sensor 150 may be transmitted via a transceiver 170, to a control unit 160. The measured data may also be stored by the control unit 160 in a database 180.

The control unit 160 is configured to perform a feed related action, based on the measured constituents, physical property or chemical property of the fodder 130, as made by the sensor 150.

The feed related action may comprise e.g. triggering an action for reducing deterioration of the fodder 130, when the difference of the measured constituents, physical property or chemical property at the first point in time and the second point in time exceeds a threshold limit.

In some embodiments, the feed related action may comprise adjusting the time interval between the remixing made by the feed displacer 140. In yet some embodiments, the feed related action may comprise increase frequency of fodder replenishment while reducing fodder quantity of each fodder replenishment. In some other embodiments, the feed related action may comprise decreasing the temperature of the fodder 130, e.g. by activating a cooler integrated in the feed displacer 140 or in the feed table 110, and/or by activating a fan, an air conditioner and/or a shower in the barn.

The feed related action may comprise generating a report in some embodiments, comprising stored feed quality and associated time references, based on the feed quality related measurements of the sensor 150. An advantage therewith is that the operator becomes aware of the fodder quality, and a tool is provided to monitor fodder quality and to trigger appropriate actions to eliminate, reduce or delay fodder deterioration; or at least compensate for any deterioration by adding nutrients.

The database 180 may store sensor measurements, possibly with a time stamp.

The generated report, or a subset thereof, may be transmitted to a portable user equipment 190 in some embodiments. The portable user equipment 190 may comprise e.g. a mobile cellular telephone, a tablet, a portable computing device, a computer, a pair of intelligent glasses, an augmented reality device, a smart watch or similar device having a user interface and communication ability. The report may comprise e.g. an audio signal, a voice message, a tactile signal, a visual message on the display, or a combination thereof.

An operator at the farm may thereby be alerted concerning the fodder quality, or concerning a measure or condition that may affect fodder deterioration such as temperature, moisture in the fodder 130, amount of protein in the fodder 130, etc. The operator thereby becomes aware of the status of the fodder 130 and may take appropriate measures in case the fodder quality is unsatisfying, i.e. below a threshold limit.

The operator may be e.g. a farmer or other person working at a farm; or a veterinarian, agronomist, dietician, biologist, zoologist, ecologist, mammologist, domestic animal researcher, zookeeper or other similar human, temporarily, accidently or permanently visiting the farm. The "farm" as the term herein is used may be a barn, a ranch, a stable or other similar agricultural structure for keeping animals.

In some embodiments, functionalities may be comprised in an application software (app) and downloaded to the portable user equipment 190 of the operator.

One example of such feed related action in order to prevent or at least delay a deterioration process of the fodder 130 may be to remix the fodder 130, e.g. by activating and circulating the feed displacer 140 more frequently; or by manually mixing the fodder 130. In an example, the feed displacer 140 may be automatically activated (and/or the frequency of runs may be increased) when a temperature measured by the sensor 150 exceeds a predetermined or configurable threshold limit.

Another example of a feed related action may be to provide less fodder 130 to the feed table 110 with the feed distributor 120, but more frequently.

In some embodiments, the feed displacer 140 may comprise a cooler, which may be triggered to start cooling the fodder 130 while circulating on the feed table 110; possibly in combination with other actions for reducing temperature at the feed table 110, such as starting/increasing intensity of fans and/or air conditioner; shower water, or possibly some other liquid, on the animals 100 in order to cool them down by evaporation of the liquid; and/or opening windows/doors in the barn for increasing air exchange.

In some embodiments, an appropriate feed additive may be provided automatically to the animals 100, when the fodder quality has been considered low, based on sensor measurements. Thereby, the milk yield of the animals 100 may be improved.

The communication between the involved entities, such as the feed displacer 140, the feed distributor 120, the sensor 150, the transceiver 170 and the portable user equipment 190 may be made over a wireless communication interface.

Such wireless communication interface may comprise, or at least be inspired by wireless communication technology such as Wi-Fi, Wireless Local Area Network (WLAN), Ultra Mobile Broadband (UMB), Bluetooth (BT) to name but a few possible examples of wireless communications in some embodiments. The communication may alternatively be made over a wireless interface comprising, or at least being inspired by radio access technologies such as e.g. 3GPP LTE, LTE-Advanced, E-UTRAN, UMTS, GSM, GSM/EDGE, WCDMA, Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (EUTRA), Universal Terrestrial Radio Access (UTRA), GSM EDGE Radio Access Network (GERAN), 3GPP2 CDMA technologies, e.g., CDMA20001×RTT and High Rate Packet Data (HRPD), or similar, just to mention some few options, via a wireless communication network.

The communication between the feed displacer 140, the feed distributor 120, the sensor 150, the transceiver 170 and the portable user equipment 190 may alternatively be made over a wired connection.

Figure 1B:
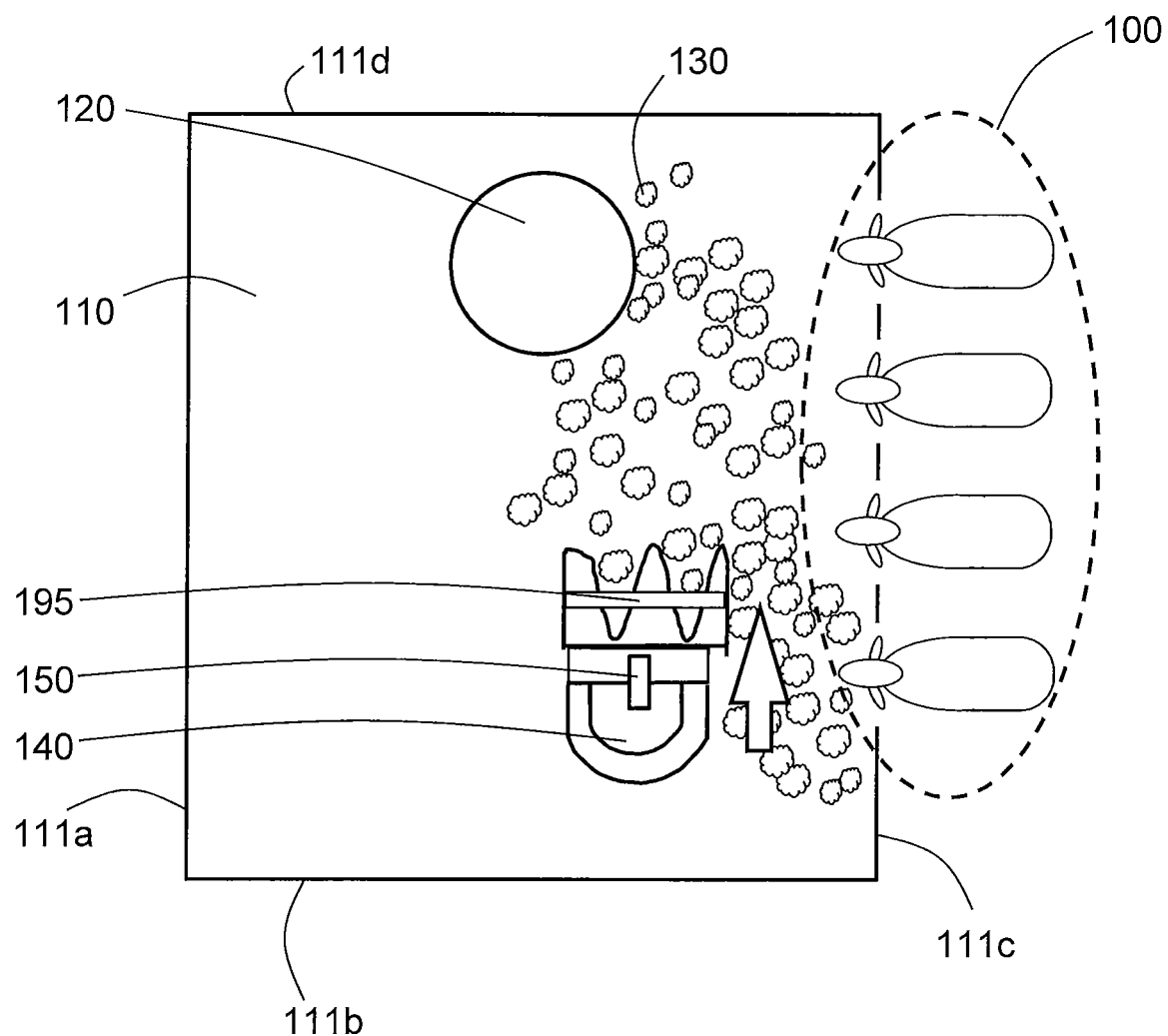
FIG. 1B illustrates an example of a feed table as regarded from above, according to an embodiment of the invention.

FIG. 1B illustrates a scenario with a feed table 110 for animals 100 similar to the one illustrated in FIG. 1A, as regarded from above.

The feed displacer 140 is moving on the feed table 110 in the direction of the arrow in FIG. 1B. Thereby, fodder 130 on the feed table 110, situated out of reach of the animals 100, is moved closer to the table edge 111a, 111b, 111c, 111d, where the animals 100 can reach the fodder 130.

The feed displacer 140 may comprise a feed pusher having a driven spiral roller which is rotating as the feed displacer 140 advances along the feed table 110. The rotating movement of the spiral roller not only displace the fodder 130, but also remix the fodder 130, which delays the deterioration process of the fodder 130.

The feed displacer 140 may also comprise a cooler 195 in some embodiments. The cooler 195 may cool down the temperature of the fodder 130 during the feed displacement process. The cooler 195 may be a thermoelectric cooler based on the Peltier effect, i.e. a Peltier element or heat pump. Alternatively, the cooler 195 may utilise a compressor and a refrigerant in combination with a fan; or merely a fan. In some alternative embodiments, the cooler 195, or an additional cooler 195 may comprise a cooling coil in, or on, the feed table 110.

Figure 1C:
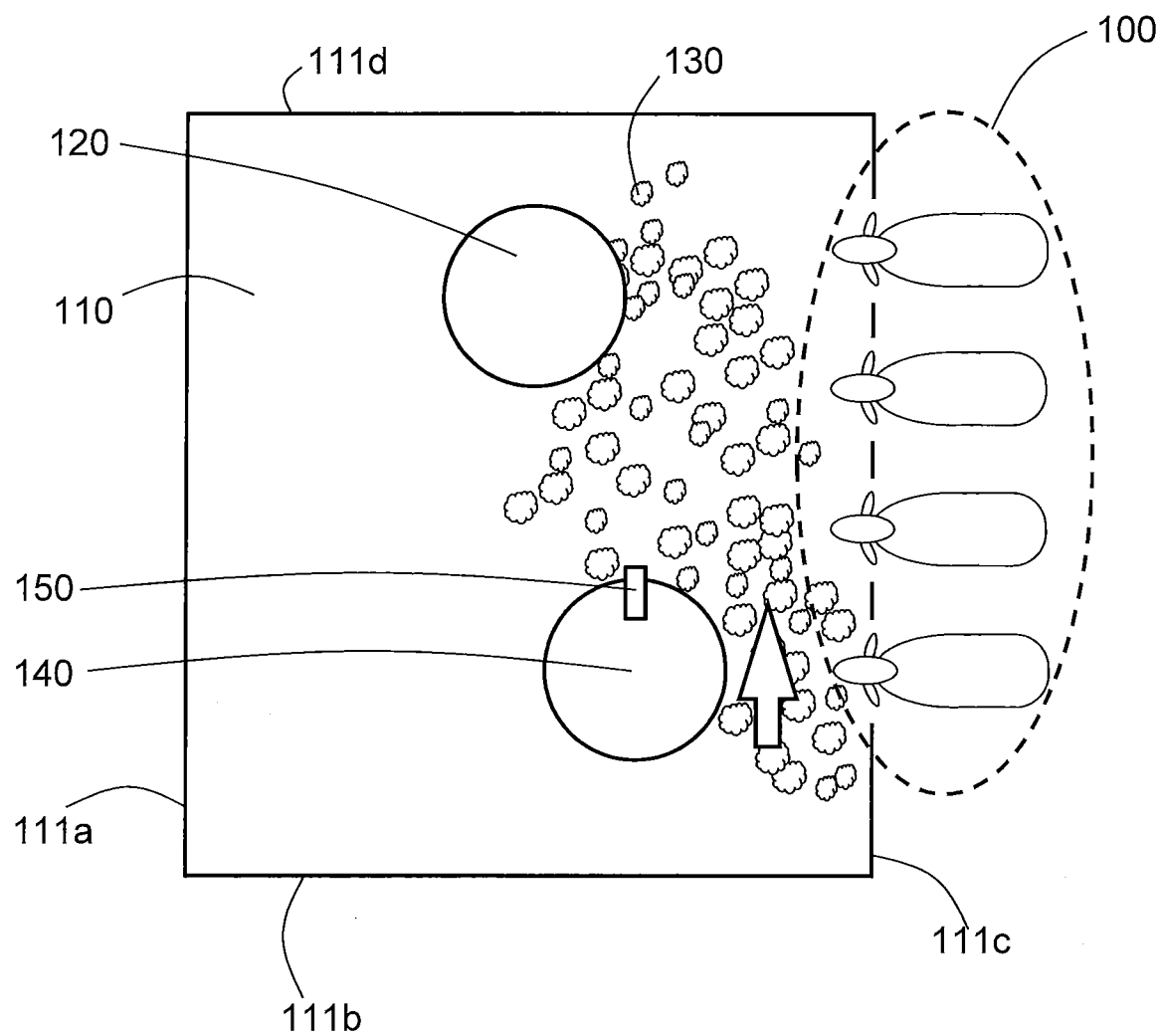
FIG. 1C illustrates an example of a feed table as regarded from above, according to an embodiment of the invention.

FIG. 1C illustrates a scenario with a feed table 110 for animals 100 similar to the one illustrated in FIG. 1A, as regarded from above.

The feed displacer 140 is moving on the feed table 110 in the direction of the arrow in FIG. 1C. The feed displacer 140 may have a substantially circular cross-section, for pushing fodder 130 aside, to an edge 111a, 111b, 111c, 111d. In some embodiments, the feed displacer 140 may comprise a feed displacement means, configured to push aside fodder 130 on the feed table 110. The feed displacement means may comprise a rotational structure, at least partly rotating around the feed displacer 140.

Figure 1D:
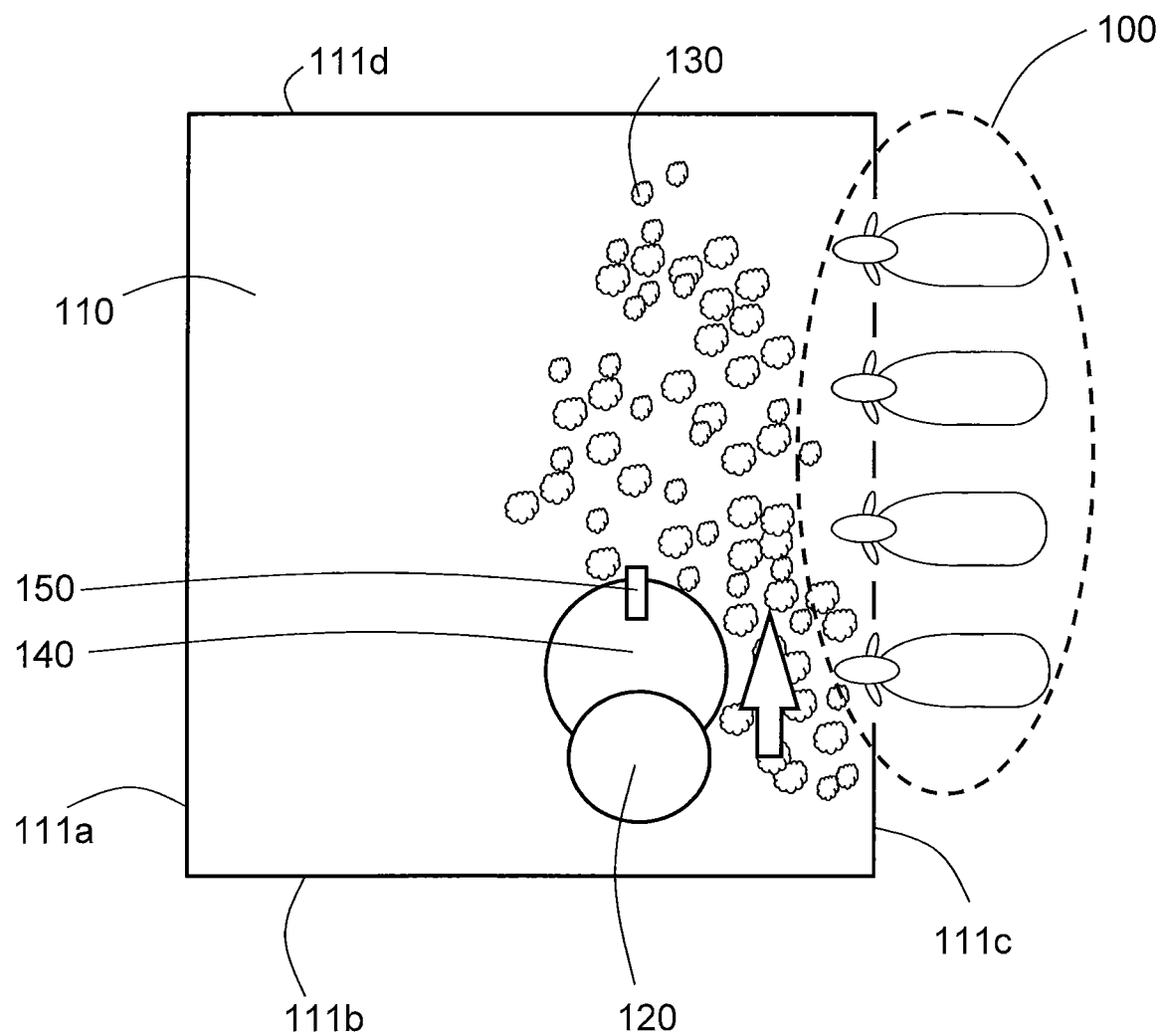
FIG. 1D illustrates an example of a feed table as regarded from above, according to an embodiment of the invention.

FIG. 1D illustrates a scenario with a feed table 110 for animals 100 similar to the one illustrated in FIG. 1A, as regarded from above.

In the embodiment illustrated in FIG. 1D, the feed distributor 120 may be situated on, or associated with the feed displacer 140. Thereby, fodder 130 may be distributed by the feed displacer 140 while moving on the feed table 110 in order to displace the fodder 130 on the feed table 110. Thereby, new fodder 130 may be provided concurrently with displacing the fodder 130 on the feed table 110. An advantage thereby achieved is that fodder 130 is exposed only a short time on the feed table 110, which reduce risks of feed deterioration.

Figure 2:
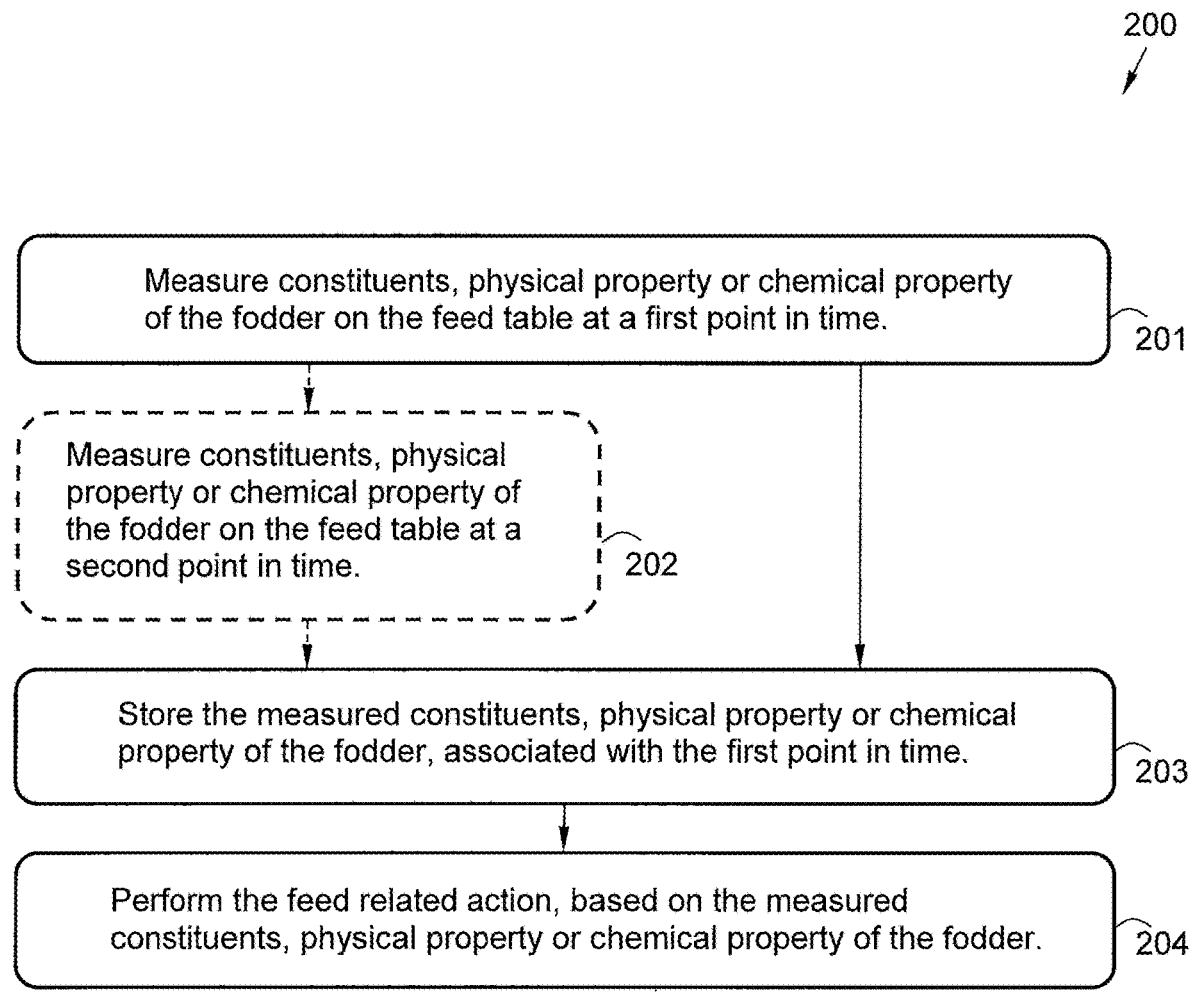
FIG. 2 is a flow chart illustrating an exemplifying embodiment of a method.

FIG. 2 illustrates an example of a method 200 according to an embodiment. The flow chart in FIG. 2 shows the method 200 performed in the system 300, arranged to perform a feed related action at a feed table 110, upon which fodder 130 for feeding of a group of animals 100 is present. Thereby feeding management of animals 100 is provided, for the purpose of increasing milk yield/meat production of animals 100 at a farm.

The feed related action may comprise displacing fodder 130 on the feed table 110 towards an edge 111a, 111b, 111c, 111d of the feed table 110. The feed related action may in some embodiments comprise remixing the fodder 130 on the feed table 110, at a time interval. The time interval between the remixing is adjusted based on the result of the measured constituents, physical property or chemical property. The feed related action may further comprise decreasing temperature of the fodder 130 by activation of a cooler 195. The feed related action may also comprise increasing frequency of fodder replenishment while reducing fodder quantity of each fodder replenishment. Alternatively, the feed related action may further comprise generating a report concerning sensor measurement values, provided with a time stamp.

In order to correctly provide feeding management of the animal 100, the method 200 may comprise a number of steps 201-204. However, some of these steps 201-204 may be performed solely in some alternative embodiments, like e.g. method step 202. Further, the described steps 201-204 may be performed in a somewhat different chronological order than the numbering suggests. The method 200 may comprise the subsequent steps:

Step 201 comprises measuring constituents, physical property or chemical property of the fodder 130 on the feed table 110, at a first point in time.

Step 202, which only may be performed in some embodiments, comprises measuring constituents, physical property or chemical property of the fodder 130 on the feed table 110 at a second point in time.

Step 203 comprises storing the measured 201 constituents, physical property or chemical property of the fodder 130, associated with the first point in time.

The measured constituents may comprise any of: protein content, dry content, fibre content, neutral detergent fibre, fat, starch, crude fibre, acid detergent fibre, lignin, vitamin content, minerals. The measured physical property may comprise any of: temperature, humidity. The measured chemical property may comprise any of potential of Hydrogen, mould, mycotoxin, amino acid, yeast, ethanol.

Step 204 comprises performing the feed related action, based on the measured 201 constituents, physical property or chemical property of the fodder 130.

In some embodiments, wherein step 202 has been performed, the feed related action may be triggered when the difference of the measured 201, 202 constituents, physical property or chemical property at the first point in time and the second point in time exceeds a threshold limit.

Figure 3:
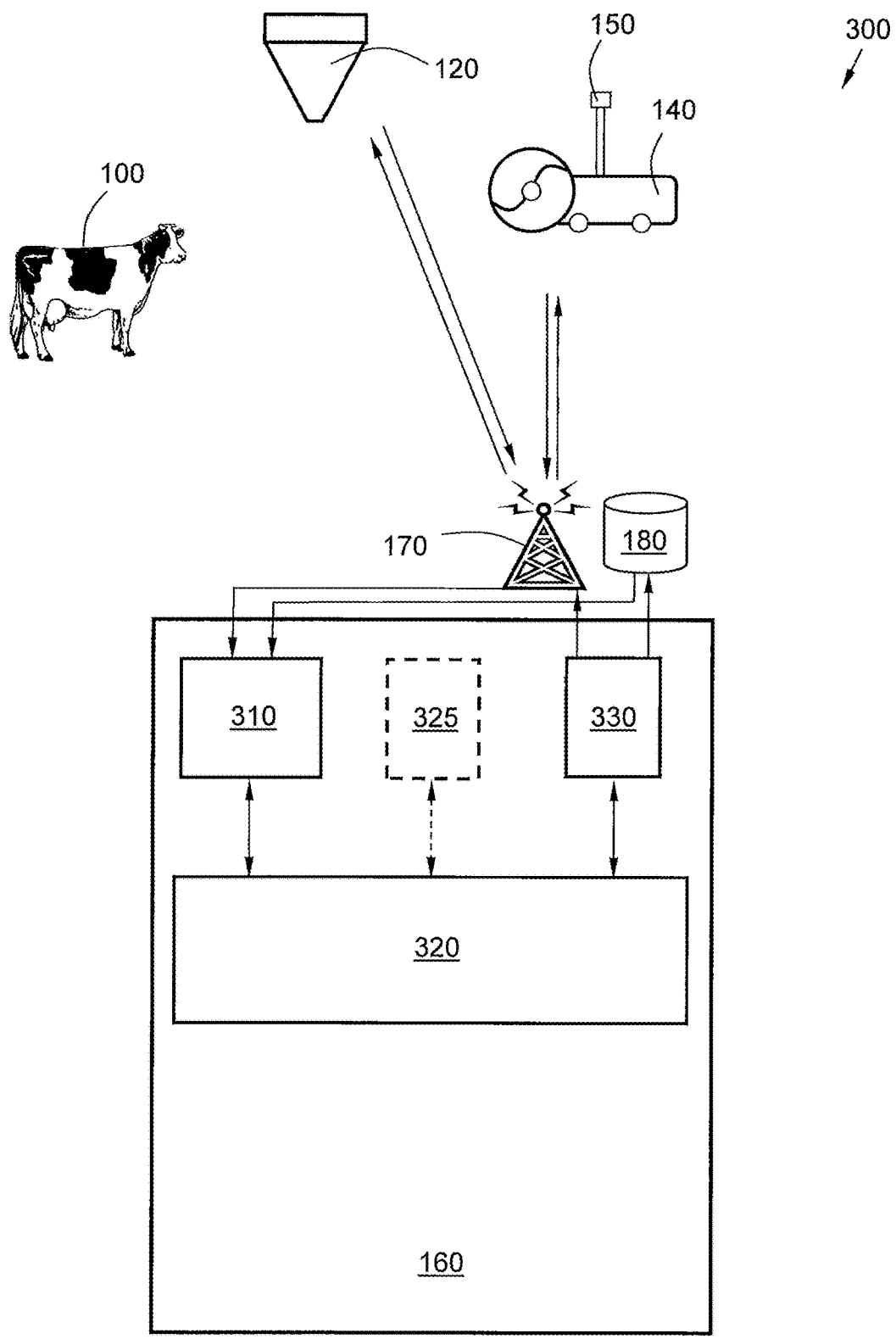
FIG. 3 is an illustration depicting a system according to an exemplifying embodiment.

FIG. 3 illustrates an embodiment of a system 300 for feeding management of an animal 100. The system 300 is arranged to perform a feed related action at a feed table 110, upon which fodder 130 for feeding of a group of animals 100 is present, by performing at least some of the previously described method steps 201-204 according to the method 200 described above and illustrated in FIG. 2.

The system 300 comprises a sensor 150, configured to measure constituents, physical property or chemical property of the fodder 130 on the feed table 110 at a first point in time and/or a second point in time. The time gap between the first point in time and the second point in time may be predetermined or configurable.

The sensor 150 may comprise a NIR sensor, a temperature sensor, etc. The sensor 150 may in some embodiments comprise a plurality of sensors of the same or distinct types, such as a plurality of NIR sensors, and/or one or more temperature sensors, and/or one or several chemical sensors.

The measured constituents may comprise any of: protein content, dry content, fibre content, neutral detergent fibre, fat, starch, crude fibre, acid detergent fibre, lignin, vitamin content, minerals. The measured physical property may comprise any of: temperature, humidity. Also, the measured chemical property may comprise any of: potential of Hydrogen, mould, mycotoxin, amino acid, yeast, ethanol.

The chemical properties may be measured by a chemical sensor, e.g. comprising a probe put in physical contact with the fodder 130. An example may be e.g. litmus strip, or a nitrazine strip to measure potential of Hydrogen. However, chemical properties may be measured by a photographic sensor such as a camera, in combination with image recognition/computer vision and object recognition, e.g. when detecting and analysing mould growth in the fodder 130.

Further the system 300 comprises a database 180, configured to store the measured constituents, physical property or chemical property of the fodder 130, associated with the first point in time.

The system 300 also comprises a control unit 160, configured to perform the feed related action, based on the measured constituents, physical property or chemical property of the fodder 130.

The control unit 160 may in some embodiments be configured to perform the feed related action by triggering an action for reducing deterioration of the fodder 130, when the difference of the measured constituents, physical property and/or chemical property at the first point in time and the second point in time exceeds a threshold limit.

The threshold limit may be set depending on the length of the time gap between the first and second points in time, and the constituent and/or parameter being measured.

The system 300 may according to some embodiments also comprise a feed displacer 140, configured to displace fodder 130 on the feed table 110 towards an edge 111a, 111b, 111c, 111d of the feed table 110.

The feed displacer 140 may be configured to remix the fodder 130 on the feed table 110 at a time interval and wherein the feed related action comprises adjusting the time interval between the remixing, based on the result of the measured constituents, physical property or chemical property.

The sensor 150 may be comprised in, or arranged at the feed displacer 140.

The system 300 also comprises a cooler 195 in some embodiments, configured to decrease temperature of the fodder 130. In embodiments wherein the feed related action comprises decreasing the temperature of the fodder 130, the cooler 195 may be activated and cool the fodder 130.

The system 300 may also in some embodiments comprise a feed distributor 120, configured to replenish fodder 130 upon the feed table 110. The feed displacer 140 may in some embodiments comprise the feed distributor 120.

The system 300 may alternatively also comprise a portable user equipment 190, configured to output information to the user, such as e.g. a cellular telephone or similar communication device.

The system 300 may furthermore comprise a wireless transceiver 170, configured to communicate wirelessly with the feed displacer 140, the feed distributor 120, the sensor 150 and/or the portable user equipment 190.

The control unit 160 may comprise a receiver 310 configured to receive information from the database 180, and/or from the transceiver 170, and thereby also with the feed displacer 140, the feed distributor 120, the sensor 150, and/or the portable user equipment 190.

The control unit 160 also comprises a processing circuitry 320 configured to perform various calculations for conducting the method 200 according to at least some of the previously described actions 201-204.

Such processing circuit 320 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Furthermore, the control unit 160 may comprise a memory 325 in some embodiments. The optional memory 325 may comprise a physical device utilised to store data or programs, i.e., sequences of instructions, on a temporary or permanent basis. According to some embodiments, the memory 325 may comprise integrated circuits comprising silicon-based transistors. The memory 325 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 160 may comprise a signal transmitter 330. The signal transmitter 330 may be configured for transmitting signals via a wired or wireless communication interface to the transceiver 170 and/or the database 180.

However, in some alternative embodiments, the system 300 may comprise additional units for performing the method 200 according to method steps 201-204.

The above described method steps 201-204 to be performed in the control unit 160 may be implemented through the one or more processing circuits 320 within the control unit 160, together with a computer program for performing at least some of the functions of the method steps 201-204. Thus, the computer program comprises instructions which, when the computer program is executed by the control unit 160 in the system 300, cause the control unit 160 to carry out the method 200 according to at least some of method steps 201-204.

The computer program mentioned above may be provided for instance in the form of a computer-readable medium, i.e. a data carrier carrying computer program code for performing at least some of the method steps 201-204 according to some embodiments when being loaded into and run by the one or more processing circuits 320 of the control unit 160. The data carrier may be, e.g., a hard disk, a CD ROM disc, a memory stick, an optical storage device, a magnetic storage device or any other appropriate medium such as a disk or tape that may hold machine readable data in a non-transitory manner. The computer program may furthermore be provided as computer program code on a server and downloaded to the control unit 160 remotely, e.g. over an Internet or an intranet connection.

The terminology used in the description of the embodiments as illustrated in the accompanying drawings is not intended to be limiting of the described method 200; the control unit 160; the computer program; the system 300 and/or the computer-readable medium. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A system configured to perform a feed-related action at a dairy animal feed table, upon which fodder for feeding of a group of dairy animals is present, the system comprising:
   the dairy animal feed table;
   at least one of i) a feed displacer configured to remix the fodder and displace the fodder on the feed table towards an edge of the feed table so that the dairy animals are enabled to conveniently reach the provided fodder, and ii) a feed distributor configured to replenish fodder upon the feed table;
   a sensor configured to measure, at a first point in time, constituents or a chemical property of the fodder distributed on the feed table, while the fodder is on the feed table for the dairy animals to eat,
   wherein the sensor is further configured to measure, at a second point in time, the constituents or the chemical property of the fodder distributed on the feed table, while the fodder is on the feed table for the dairy animals to eat,
   wherein the feed displacer or the feed distributor comprises the sensor;
   a database configured to store the measured constituents or the measured chemical property of the fodder, measured while the fodder is on the feed table, associated with the first point in time; and
   a controller configured to perform the feed-related action, based on the measured constituents or the measured chemical property of the fodder, measured while the fodder is on the feed table,
   wherein, for reducing or delaying deterioration of the fodder in the measured constituents or the chemical property, when the difference of the measured constituents or the measured chemical property at the first point in time and the second point in time exceeds a threshold limit indicating a deterioration of the fodder on the feed table, the controller is configured to
   i) increase a frequency of fodder replenishment by the feed distributor while reducing fodder quantity of each fodder replenishment, or
   ii) reduce a time interval between the feed displacer remixing the fodder on the feed table.

2. The system according to claim 1, wherein the feed-related action comprises the reducing of the time interval between the remixing of the fodder on the feed table, based on the result of the measured constituents, measured while the fodder is on the feed table, or the measured chemical property, measured while the fodder is on the feed table, indicating the deterioration of the fodder on the feed table.

3. The system according to claim 1, wherein the feed-related action comprises the increasing of the frequency of fodder replenishment while reducing fodder quantity of each fodder replenishment.

4. The system according to claim 1, wherein the sensor comprises a Near-Infra Red sensor.

5. The system according to claim 1, wherein the sensor comprises a temperature sensor.

6. The system according to claim 1, further comprising a cooler configured to decrease a temperature of the fodder, and
wherein the feed-related action further comprises decreasing the temperature of the fodder.

7. The system according to claim 1, comprising both the feed displacer and the feed distributor, and wherein the feed displacer comprises the feed distributor.

8. The system according to claim 1, wherein:
the measured constituents comprise any of: protein content, dry content, fiber content, neutral detergent fiber, fat, starch, crude fiber, acid detergent fiber, lignin, vitamin content, and minerals, and
the measured chemical property comprises any of: potential of Hydrogen, mold, mycotoxin, amino acid, yeast, and ethanol.

9. The system according to claim 1, wherein the measured constituents comprise any of: protein content, dry content, fiber content, neutral detergent fiber, fat, starch, crude fiber, acid detergent fiber, lignin, vitamin content, and minerals.

10. The system according to claim 1, wherein the measured chemical property comprises any of: potential of Hydrogen, mold, mycotoxin, amino acid, yeast, and ethanol.

11. The system according to claim 1, wherein the feed table includes a feed fence that prevents the dairy animals from entering the feed table.

12. The system according to claim 1, wherein the feed table includes a restrictive construction that prevents the dairy animals from entering the feed table.

13. A method to perform a feed-related action at a dairy animal feed table, upon which fodder for feeding of a group of dairy animals is present, the method comprising:
measuring, at a first point in time, constituents or a chemical property of the fodder distributed on the feed table, measured while the fodder is on the feed table for the dairy animals to eat;
measuring, at a second point in time, the constituents or the chemical property of the fodder distributed on the feed table, measured while the fodder is on the feed table for the dairy animals to eat;
storing the measured constituents or the measured chemical property of the fodder, measured while the fodder is on the feed table, associated with the first point in time; and
performing the feed-related action, based on the measured constituents or the measured chemical property of the fodder, measured while the fodder is on the feed table, indicating a deterioration of the fodder on the feed table,
wherein the performance of the feed-related action is triggered, for reducing or delaying deterioration of the fodder in the measured constituents or the measured chemical property, when the difference of the measured constituents or the measured chemical property at the first point in time and the second point in time exceeds a threshold limit,
wherein the feed-related action comprises:
i) increasing a frequency of fodder replenishment while reducing fodder quantity of each fodder replenishment, or
ii) displacing fodder on the feed table towards an edge of the feed table and remixing the fodder on the feed table, and reducing a time interval between remixing the fodder on the feed table based on the result of the measured constituents or the measured chemical property.

14. The method according to claim 13, wherein the feed-related action comprises the displacing of the fodder on the feed table towards the edge of the feed table and remixing the fodder on the feed table, at the time interval where the time interval between the remixing is reduced based on the result of the measured constituents, measured while the fodder is on the feed table, or the measured chemical property, measured while the fodder is on the feed table, indicating the deterioration of the fodder on the feed table.

15. The method according to claim 13, wherein the feed-related action comprises decreasing a temperature of the fodder by activation of a cooler.

16. The method according to claim 13, wherein the feed-related action comprises the increasing of the frequency of fodder replenishment while reducing fodder quantity of each fodder replenishment.

* * * * *